J. W. Jarboe,
Water Pails &c. of Prepared Paper,
Nº 67,984.    Patented Aug. 20, 1867.

Witnesses.
Theo Insche
W. Truvin

Inventor.
J W Jarboe
Per Munn&Co
Attorneys

UNITED STATES PATENT OFFICE.

JOHN WILLIAM JARBOE, OF GREEN POINT, NEW YORK.

IMPROVEMENT IN MODE OF MANUFACTURING WATER-PAILS AND OTHER HOUSEHOLD VESSELS.

Specification forming part of Letters Patent No. 67,981, dated August 20, 1867.

*To all whom it may concern:*

Be it known that I, JOHN WILLIAM JARBOE, of Green Point, Kings county, New York, have invented a new and Improved Water-Pail, &c., of Chemically-Prepared Paper; and I do hereby declare that the following is a full, clear, and exact description thereof, which will enable others skilled in the art to make and use the same, reference being had to the accompanying drawings forming part of this specification, in which—

Figure 1:
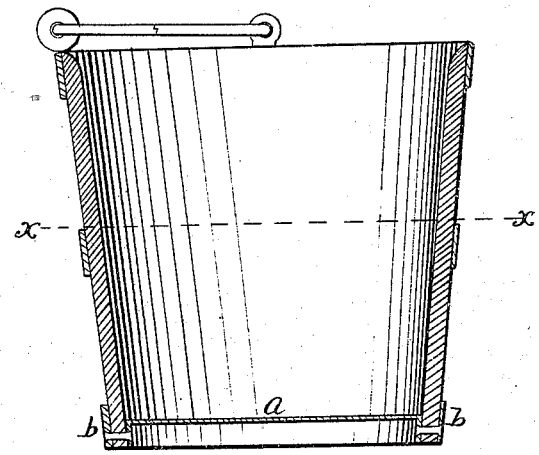
Figure 2:
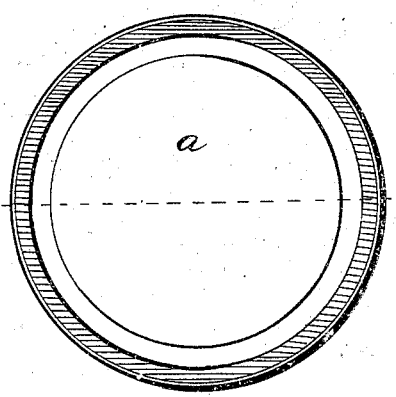

Figure 1 represents a sectional elevation of a pail with a metal bottom, and Fig. 2 is a section through the line *x x*.

The present invention relates to the manufacture of water-pails and other articles of household furniture, such as refrigerators, ice-coolers, waste-basins, spittoons, chamber pails and pots, &c., made of chemically-prepared paper, which is coated with varnish after the article is formed and dried.

The great benefit derived in manufacturing the specified articles of this chemically-prepared paper is, that it will never shrink, rust, water-soak, or rot; and furthermore, liquids, when put in any of the articles, will not be impregnated with any smell, or made to taste unpleasant from the newness of the bucket, &c.; and, furthermore, it will not absorb or retain any liquid or smell, as it is free from pores, and can thus easily be kept clean and sweet.

The paper can be used in layers or reduced to pulp, as in the manufacture of *papier-maché*, it being previously dipped in an alkali and then dried, after which it is dipped in linseed-oil, and then hardened or dried by subjecting it to a heat of 125° Fahrenheit. The shaping and pressing are done by means of passing the pulp or paper between cylinders or suitable dies. When thoroughly dry, an additional protection is given to the bucket or other article by coating the same with a vegetable varnish, which is not injurious in the use.

The bottoms of the pails, &c., may either be made of metal *a*, and riveted, through the sides of the bucket, to the hoop *b*, or can be made entirely of paper prepared as before described.

For sea-going vessels, I prefer making the bottoms of the pails of brass or copper. Covers may be made of the same material as that of the pails, &c.

This pail has been tested, and is warranted to stand 250° Fahrenheit for thirty-six hours without injury. Boiling water and petroleum oil have no effect on this pail.

I claim as new and desire to secure by Letters Patent—

The manufacture of pails and other articles of household furniture, for holding water, &c., made of paper, in the manner substantially as herein shown and described.

The above specification of my invention signed by me this 11th day of July, 1867.

JOHN WILLIAM JARBOE.

Witnesses:
WM. F. MCNAMARA,
CHARLES H. NASH.